(12) United States Patent
Bouhadir et al.

(10) Patent No.: US 6,545,098 B1
(45) Date of Patent: Apr. 8, 2003

(54) SYNTHESIS METHOD FOR BLOCK POLYMERS BY CONTROLLED RADICAL POLYMERIZATION FROM DITHIOESTER COMPOUNDS

(75) Inventors: Ghenwa Bouhadir, Gif sur Yvette (FR); Dominique Charmot, Los Gatos, CA (US); Pascale Corpart, Sannois (FR); Samir Zard, Gif sur Yvette (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/582,401
(22) PCT Filed: Dec. 28, 1998
(86) PCT No.: PCT/FR98/02891
§ 371 (c)(1),
(2), (4) Date: Aug. 17, 2000
(87) PCT Pub. No.: WO99/35178
PCT Pub. Date: Jul. 15, 1999

(30) Foreign Application Priority Data

Dec. 31, 1997 (FR) ............................................ 97 16779

(51) Int. Cl.⁷ .............................................. C08F 293/00
(52) U.S. Cl. ...................... 525/244; 525/261; 525/308; 525/309
(58) Field of Search ................................ 525/244, 261, 525/267, 291, 308, 309; 526/286, 243, 248, 259, 262, 273, 287, 279, 297, 303.1

(56) References Cited

U.S. PATENT DOCUMENTS

| 2,396,997 | A | 3/1946 | Fryling |
| 3,580,830 | A | 5/1971 | Siebert |
| 5,089,601 | A | 2/1992 | Ozoe |
| 5,314,962 | A | 5/1994 | Otsu |
| 5,356,947 | A | 10/1994 | Ali |

FOREIGN PATENT DOCUMENTS

| AU | WO-92/13903 | 8/1992 |
| EP | 296850 | 12/1988 |
| EP | 349232 | 1/1990 |
| WO | WO92/13903 | 8/1992 |
| WO | WO96/15157 | 5/1996 |
| WO | WO98/58974 | 12/1998 |
| WO | WO99/31144 | 6/1999 |

OTHER PUBLICATIONS

XP 002046219 Plaste und Kautschuk 39 Jahrgang Heft Apr. 1992, 122–123, Beschleuniger fur Cyanacrylatklebstoffe, Mobius et al.

XP 002049822 Bulletin of the Tokyo Institute of Technology, 78, 1966, Syntheses and Photochemical reactions of polymers containing dithiocarbamate and xanthate groups and their model compounds, Okawara et al.

Primary Examiner—Christopher Henderson

(57) ABSTRACT

The invention concerns a method for preparing, by radical polymerisation, block polymers of general formula (1), which consists in contacting: an ethylenically unsaturated monomer of formula CYY'(=CW—CW')$_a$=CH$_2$: and a precursor compound of general formula (II): a radical polymerization initiator.

12 Claims, No Drawings

SYNTHESIS METHOD FOR BLOCK POLYMERS BY CONTROLLED RADICAL POLYMERIZATION FROM DITHIOESTER COMPOUNDS

This application is an application under 35 U.S.C. Section 371 of International Application Number PCT/FR98/02891 filed on Dec. 28, 1998.

The present invention relates to a novel radical polymerization process a process for obtaining block copolymers.

Block polymers are usually prepared by ionic polymerization. This type of polymerization has the drawback of only allowing the polymerization of certain types of non-polar monomers, especially styrene and butadiene, and of requiring a particularly pure reaction mixture and temperatures which are often below room temperature so as to minimize parasitic reactions, thus giving severe operational constraints.

Radical polymerization has the advantage of being easily carried out without having to comply with excessive purity conditions, and at temperatures greater than or equal to room temperature. During this polymerization, macroradicals, which have a very short lifetime, recombine irreversibly by coupling or dismutation. When the polymerization takes place in the presence of several comonomers, the compositional variation of the mixture is infinitely slow compared with the lifetime of the macroradical so that the chains have a random sequence of monomer units and not a block-type sequence.

Consequently, until recently a radical polymerization process allowing block polymers to be obtained did not exist.

Since then, a new radical polymerization process has been developed, namely "controlled" or "living" radical polymerization. This controlled radical polymerization is characterized by reversible termination of the macroradicals.

At the present time, several controlled radical polymerization techniques are known, in which the ends of polymer chains may be reactivated in the form of a radical by homolytic bond (for example, C—O or C-halogen) scission.

Controlled radical polymerization therefore has the following distinct characteristics:

1. the number of chains is fixed throughout the duration of the reaction,
2. the chains all grow at the same rate, resulting in:
   a linear increase in the molecular masses with conversion,
   a narrow distribution of masses,
3. the average molecular mass is controlled by the monomer/chain-precursor molar ratio, and
4. the possibility of preparing block copolymers.

The controlled character is even more pronounced when the rate of consumption of the precursor is very much greater (initiation) than the rate of growth of the chains (propagation). There are cases where this is not always true and conditions 1 and 2 are not observed, nevertheless it is always possible to prepare block copolymers.

Several approaches have been described for controlling radical polymerization. The most commonly cited consists in introducing, into the mixture, counter radicals which combine reversibly with the growing macroradicals, such as, for example, nitroxyl radicals (Georges et al., *Macromolecules*, 26, 2987, (1993)). This technique is characterized by high temperatures for labilizing the C—O bond.

Another method, called *Atom Transfer Radical Polymerization*, makes use of transition metal salts combined with organic ligands and an initiator generally consisting of an organic halide; control of the polymerization is made possible by the reversibility of the C-halogen bond (K. Matyjaszewski, PCT WO 96/30421). One drawback with this polymerization is that a stoichiometric quantity of metal per chain remains.

Otsu (Otsu et al., *Makromol. Chem. Rapid Comm.*, 3, 127–132, (1982), Otsu et al. ibid, 3, 123–140, (1982), Otsu et al., *Polymer Bull.*, 7, 45, (1984), ibid, 11, 135, (1984), Otsu et al, *J. Macromol. Sci. Chem.*, A21, 961, (1984) and Otsu et al., *Macromolecules*, 19, 2087, (1989)) has shown that certain organic sulphides, particularly dithiocarbamates, allowed chains to be grown in a controlled manner under UV irradiation, according to the principle:

Reaction 1

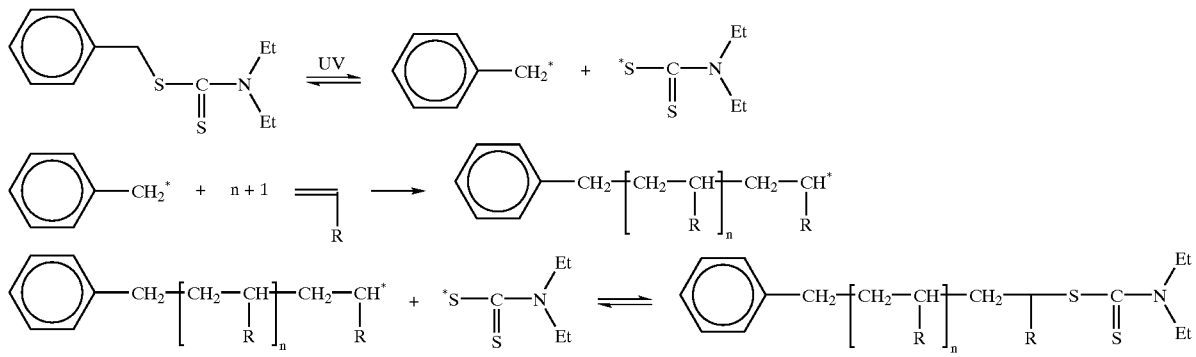

The principle relies on the photolysis of the C—S bond, which regenerates the carbon macroradical, on the one hand, and the dithiocarbamyl radical, on the other hand. The controlled character of the reaction is due to the reversibility of the C—S bond under UV irradiation. It is thus possible to obtain block copolymers. On the other hand, the rate of exchange in propagating species and "dormant" species is not very large compared with the rate of propagation, this having the consequence of generating relatively broad molecular mass distributions. Thus, the dispersion index ($PI=M_w/M_n$) is between 2 and 5 (Otsu et al., 25, 7/8, 643–650, (1989)).

Controlled radical polymerization has an advantage over conventional radical polymerization when it is a question of preparing low-molecular-weight functionalized chains (reactive telomers). Such polymers are desirable for specific applications such as, for example, coatings and adhesives.

Thus, when it is attempted to synthesize chains grafted with, on average, 2 functional comonomers, the fraction of chains with at most one functional site becomes large when the average degree of polymerization is less than a threshold value (e.g. 20 or 30). Controlled radical polymerization makes it possible to reduce, or even to inhibit, the formation of these oligomers having zero or one functional site which degrade the performance in terms of application.

One object of the present invention is to provide a novel radical polymerization process for the synthesis of block polymers.

Another object is to provide a radical polymerization process for the synthesis of block polymers from all types of monomers.

Another object is to provide a radical polymerization process for the synthesis of block polymers and block copolymers having a low polydispersity index.

Another object is to provide a radical polymerization process for the synthesis of block polymers containing no metal impurities deleterious to their use.

Another object is to provide a radical polymerization process for the synthesis of block copolymers, the said polymers being chain-end functionalized.

To these ends, the invention relates to a process for preparing, by radical polymerization, block polymers of general formula (I):

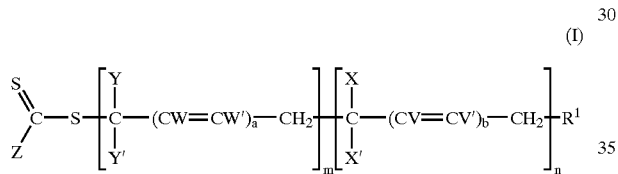

in which process, the following are brought into contact with each other:

an ethylenically unsaturated monomer of formula: $CYY'(=CW-CW')_a=CH_2$, a precursor compound of general formula (II):

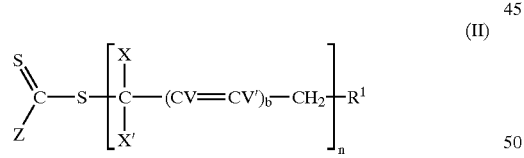

a radical polymerization initiator.

The invention also relates to block polymers which can be obtained by the above process, and the polydispersivity index of which is at most 2, and more particularly at most 1.5.

Finally, the invention relates to polymers of general formulae (II) having a polydispersivity index of at most 2, and more particularly at most 1.5.

Further details and advantages of the invention will become clearer on reading the description and from the examples.

The invention first of all relates to a process for preparing, by radical polymerization, block polymers of general formula (I):

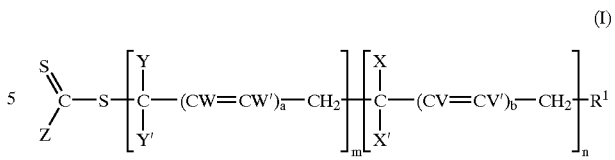

in which formula:

Z is an alkene or alkyne radical, optionally substituted with:
- an optionally substituted alkyl, acyl, aryl, alkene or alkyne group,
- an optionally substituted or aromatic, saturated or unsaturated, carbocycle,
- an optionally substituted, saturated or unsaturated, heterocycle,
- alkoxycarbonyl or aryloxycarbonyl (—COOR'), carboxyl (—COOH), acyloxy (—O$_2$CR'), carbamoyl (—CONR'$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR'$_2$), halogen, allyl, epoxy, alkoxy (—OR'), S-alkyl, S-aryl or organosilyl groups,
- groups having a hydrophilic or ionic character, such as the alkali metal salts of carboxylic acids or the alkali metal salts of sulphonic acid, polyalkylene oxide chains (PEO, PPO), cationic substituents (quaternary ammonium salts), R represents:
- an optionally substituted alkyl, acyl, aryl, alkene or alkyne group (i), or
- an optionally substituted or aromatic, saturated or unsaturated, carbocycle (ii), or
- an optionally substituted, saturated or unsaturated, heterocycle (iii),
- it being possible for these groups and rings (i), (ii) and (iii) to be substituted with substituted phenyl groups or substituted aromatic groups, groups: alkoxycarbonyl or aryloxycarbonyl (—COOR'), carboxyl (—COOH), acyloxy (—O$_2$CR'), carbamoyl (—CONR'$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR'$_2$), halogen, allyl, epoxy, alkoxy (—OR'), S-alkyl, S-aryl, groups having a hydrophilic or ionic character, such as the alkali metal salts of carboxylic acids, the alkali metal salts of sulphonic acid, polyalkylene oxide chains (PEO, PPO), cationic substituents (quaternary ammonium salts), organosilyl, R' representing an alkyl or aryl group, V, V', W and W', which are identical or different, represent: H, an alkyl group or a halogen, X, X', Y and Y', which are identical or different, represent H, a halogen or an R", OR", OCOR", NHCOH, OH, NH$_2$, NHR", N(R")$_2$, H$_2$N$^+$O$^-$, (R")$_2$N$^+$O$^-$, NHCOR", CO$_2$H, CO$_2$R", CN, CONH$_2$, CONHR" or CON(R")$_2$ group, in which R" is chosen from alkyl, aryl, aralkyl, alkaryl, alkene or organosilyl groups, optionally perfluorinated and optionally substituted with one or more carboxyl, epoxy, hydroxyl, alkoxy, amino, halogen or sulphonic groups, a and b, which are identical or different, are equal to 0 or 1, m and n, which are identical or different, are greater than or equal to 1 and, when one or other is greater than 1, the individual repeat units are identical or different, in which process the following are brought into contact with each other:

an ethylenically unsaturated monomer of formula: CYY' (=CW—CW')$_a$=CH$_2$, a precursor compound of general formula (II):

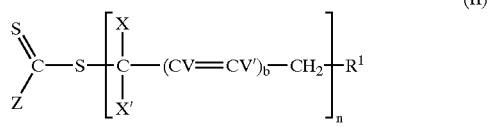

(II)

a radical polymerization initiator.

The process consists in bringing into contact with each other a radical polymerization initiator, an ethylenically unsaturated monomer and a precursor of general formula (II).

The radical polymerization initiator may be chosen from the initiators conventionally used in radical polymerization. These may, for example, be one of the following initiators:

hydrogen peroxides such as: tert-butyl hydroperoxide, cumene hydroperoxide, tert-butyl peroxyacetate, tert-butyl peroxybenzoate, tert-butyl peroxyoctoate, tert-butyl peroxyneodecanoate, tert-butyl peroxyisobutyrate, lauroyl peroxide, tert-amyl peroxypivalate, tert-butyl peroxypivalate, dicumyl peroxide, benzoyl peroxide, potassium persulphate and ammonium persulphate;

azo compounds such as: 2-2'-azobis(isobutyronitrile), 2,2'-azobis(2-butanenitrile), 4,4'-azobis(4-pentanoic acid), 1,1'-azobis(cyclohexanecarbonitrile), 2-(tert-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl)propionamide, 2-2'-azobis(N,N'-dimethyleneisobutyramidine) dichloride, 2,2'-azobis(2-amidinopropane)dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide] and 2,2'-azobis(isobutyramide) dihydrate;

redox systems including combinations such as:

mixtures of hydrogen peroxide or alkyl peroxide, peresters, percarbonates and the like and of any one of the salts of iron, titanous salts, zinc formaldehyde sulphoxylate or sodium formaldehyde sulphoxylate, and reducing sugars;

alkali-metal or ammonium persulphates, perborates or perchlorates in combination with an alkali metal bisulphite, such as sodium metabisulphite, and reducing sugars;

alkali-metal persulphates in combination with an arylphosphinic acid, such as benzenephosphonic acid and other similar acids, and reducing sugars.

The amount of initiator to be used is determined so that the amount of radicals generated is at most 20 mol % with respect to the amount of compound (II), preferably at most 5 mol %.

As ethylenically unsaturated monomer, the monomers chosen from styrene or its derivatives, butadiene, chloroprene, (meth)acrylic esters, vinyl esters of carboxylic acid, vinylamine amides, amides of unsaturated carboxylic acids and vinyl nitrites are more specifically used according to the invention.

Butadiene and chloroprene correspond to the case in which a and b equal 1 in the formulae (I), (II) and in the formula for the monomer given above.

"(Meth)acrylic esters" should be understood to mean esters of acrylic acid and of methacrylic acid with hydrogenated or fluorinated $C_1$–$C_{12}$, preferably $C_1$–$C_8$, alcohols. Among compounds of this type, mention may be made of: methyl acrylate, ethyl acrylate, propyl acrylate, n-butyl acrylate, isobutyl acrylate, 2-ethylhexyl acrylate, tert-butyl acrylate, methyl methacrylate, ethyl methacrylate, n-butyl methacrylate and isobutyl methacrylate.

The vinyl nitrites include more particularly those having from 3 to 12 carbon atoms, such as, in particular, acrylonitrile and methacrylonitrile.

It should be noted that styrene may be replaced, completely or partly, by derivatives such as alpha-methylstyrene or vinyltoluene.

The other ethylenically unsaturated monomers which can be used, alone or as mixtures, or which can be copolymerized with the above monomers, are, for example:

vinyl esters of carboxylic acids, such as vinyl acetate, vinyl versatate and vinyl propionate;

vinyl halides;

ethylenically unsaturated monocarboxylic and dicarboxylic acids, such as acrylic acid, methacrylic acid, itaconic acid, maleic acid and fumaric acid, and monoalkyl esters of dicarboxylic acids of the type mentioned with alkanols preferably having from 1 to 4 carbon atoms and their N-substituted derivatives;

amides of unsaturated carboxylic acids, such as acrylamide, methacrylamide, N-methylolacrylamide or methacrylamide, and N-alkylacrylamides;

amides of vinylamine, especially vinylformamide or vinylacetamide;

ethylenic monomers containing a sulphonic acid group and its ammonium or alkali metal salts, for example vinylsulphonic acid, vinylbenzenesulphonic acid, alpha-acrylamidomethylpropanesulphonic acid and 2-sulphoethylene methacrylate;

unsaturated ethylenic monomers containing a secondary, tertiary or quaternary amino group, or a heterocyclic group containing nitrogen, such as, for example, vinylpyridines, vinylimidazole, vinylpyrrolidone, aminoalkyl (meth)acrylates and aminoalkyl (meth)acrylamides such as dimethylaminoethyl acrylate or methacrylate, di-tert-butylaminoethyl acrylate or di-tert-butylaminoethyl methacrylate and dimethylaminomethylacrylamide or dimethylaminomethylmethacrylamide. Likewise, it is possible to use zwitterionic monomers such as, for example, sulphopropyl (dimethyl)aminopropyl acrylate.

In order to prepare the copolymers of formula (I) for which Y=H and Y'=NH$_2$, it is preferred to use as ethylenically unsaturated monomers the amides of vinylamine, for example vinylformamide or vinylacetamide. The copolymer obtained is then hydrolysed to acid or basic pH.

In order to prepare the copolymers of formula (I) for which Y=H and Y'=OH, it is preferred to use as ethylenically unsaturated monomers vinyl esters of carboxylic acid such as, for example, vinyl acetate. The copolymer obtained is then hydrolysed to acid or basic pH.

The types and amounts of copolymerizable monomers employed according to the present invention vary depending on the particular final application for which the block polymer is intended. These variations are well known and may be easily determined by those skilled in the art.

In order for the polymer of general formula (I) to be a block polymer, the "precursor" compound of general formula (II) must be a polymer.

Thus, n is greater than or equal to 1, preferably greater than or equal to 6. The monomer units of this polymer may be identical or different.

Preferably, in the formula (II), $R^1$ represents:
a group of formula $CR^{12}R^{13}R^{14}$, in which
$R^{12}$, $R^{13}$ and $R^{14}$ represent groups (i), (ii) or (iii) as defined above, or
$R^{12}=R^{13}=H$ and $R^{14}$ is an aryl, alkene or alkyne group, or
a —CO—$R^{15}$ group in which $R^{15}$ represents a group (i), (ii) or (iii) as defined above.

Preferably, $R^1$ is a group chosen from the benzyl groups and:

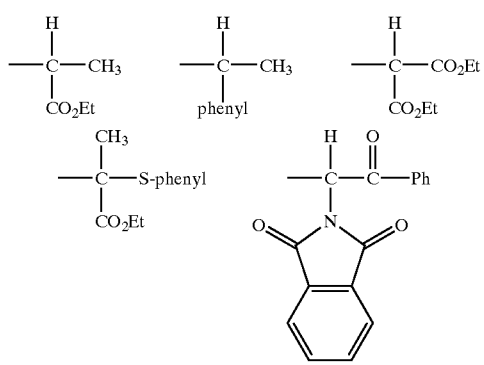

In formula (II), Z is an alkene or alkyne radical.

The most interesting results were obtained for compounds of formula (II) in which Z is an alkene.

This precursor polymer (II) may come from the radical polymerization of an ethylenically unsaturated monomer of formula: $CXX'(=CV-CV')_b=CH_2$ by bringing the said monomer into contact with a radical polymerization initiator and a compound of general formula (III), (IV) or (V):

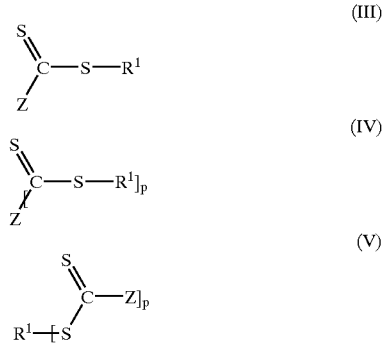

being between 2 and 10, preferably between 2 and 5.

During this synthesis, the radical polymerization initiators and the ethylenically unsaturated monomers are of the type of those mentioned previously.

As regards the compounds of general formulae (III), (IV) or (V), the symbols $R^1$ and Z have the same meaning as previously. Likewise, the preferences with regard to its symbols are the same as previously.

When Z represents an alkene group, the compounds of formula (III) correspond to the following formula (IIIA):

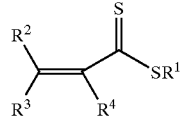

in which $R^2$, $R^3$ and $R^4$ represent:
an optionally substituted alkyl, acyl, aryl, alkene or alkyne group,
an optionally substituted or aromatic, saturated or unsaturated, carbocycle,
an optionally substituted, saturated or unsaturated, heterocycle,
alkoxycarbonyl or aryloxycarbonyl (—COOR'), carboxyl (—COOH), acyloxy (—O₂CR'), carbamoyl (—CONR'₂), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR'₂), halogen, allyl, epoxy, alkoxy (—OR'), S-alkyl⁻, S-aryl or organosilyl groups.
groups having a hydrophilic or ionic character, such as the alkali metal salts of carboxylic acids or the alkali metal salts of sulphonic acid, polyalkylene oxide chains (PEO, PPO), cationic substituents (quaternary ammonium salts).

According to a variant of the invention, the compound of formula (IIIA) may be such that $R^4$ and $R^3$ form part of the same carbocycle or heterocycle, such as, for example, the following compound:

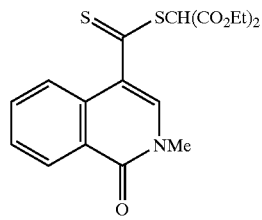

The compounds of general formula (IIIA), for which Z represents an alkene, are readily obtainable. They may, especially, be obtained by an addition reaction of an organomagnesium compound on a β-oxodithioester. The β-hydroxydithioester obtained is then dehydrated in order to give α, β ethylenic dithioesters of general formula (IIIA). Another method of preparing these compounds consists in carrying out the addition of a vinyl magnesium compound on carbon disulphide, followed by an alkylation using an alkyl iodide, bromide or chloride.

The complete process of synthesizing, by radical polymerization, a block polymer of general formula (I) according to the invention may therefore consist in:

(1) synthesizing a polymer by bringing into contact with each other an ethylenically unsaturated monomer of formula $(CXX'(=CV-CV')_b=CH_2$, a radical polymerization initiator and a compound of formula (III), (IV) or (V), (2) using this polymer obtained as precursor of general formula (II) in order to prepare a diblock polymer by bringing it into contact with a new ethylenically unsaturated monomer of formula: $CYY'(=CW-CW')_a=CH_2$ and a radical polymerization initiator.

This step (2) may be repeated as many times as desired using new monomers to synthesize new blocks and to obtain a multiblock polymer.

As indicated previously, for the preparation of precursors of formula (II) for which X=H and X'=NH$_2$ (step (1) defined hereinabove), it is preferred to use, as ethylenically unsaturated monomers, amides of vinylamine, for example vinylformamide or vinylacetamide. The polymer obtained is then hydrolysed to acid or basic pH.

Likewise, for the preparation of precursors of formula (II) for which X=H and X'=OH, it is preferred to use vinyl esters of carboxylic acids, such as vinyl acetate for example, as ethylenically unsaturated monomers. The polymer obtained is then hydrolysed to acid or basic pH.

According to this principle, the invention also relates to a process for preparing multiblock polymers, in which the implementation of the process previously described is repeated at least once, using:
  different monomers from those of the previous implementation, and
  instead of the precursor compound of formula (II), the block polymer coming from the previous implementation.

If the implementation is repeated once, a triblock polymer will be obtained, if it is repeated twice, a "quadriblock" polymer will be obtained, and so on. In this way, at each new implementation, the product obtained is a block polymer having an additional polymer block.

Therefore, in order to prepare multiblock polymers, the process consists in repeating, several times, the implementation of the preceding process on the block polymer coming from each previous implementation using different monomers.

According to this method of preparing multiblock polymers, when it is desired to obtain homogeneous block polymers without a composition gradient, and if all the successive polymerizations are carried out in the same reactor, it is essential for all the monomers used in one step to have been consumed before the polymerization of the next step starts, therefore before the new monomers are introduced.

The compounds of formula (IV) and (V) are advantageous as they allow a polymer chain to be grown on at least two active sites. With this type of compound, it is possible to save on polymerization steps in order to obtain an n-block copolymer.

Thus, if p=2, the first block is obtained by the polymerization of a monomer M1 in the presence of the compound of formula (IV) or (V). This first block may then grow at each of its ends by the polymerization of a second monomer M2. A triblock copolymer is obtained. This triblock polymer itself may grow at each of its ends by the polymerization of a third monomer M3. Thus, a "pentablock" copolymer is obtained in only three steps.

If p is greater than 2, the process makes it possible to obtain homopolymers or block copolymers whose structure is "multi-branched" or "hyperbranched".

The polymerization may be carried out in bulk, in solution or in emulsion.

The process is preferably carried out in a semi-continuous manner.

The temperature may vary between ambient temperature and 150° C., depending on the nature of the monomers used.

In general, during the polymerization, the instantaneous polymer content with respect to the instantaneous amount of monomer and polymer is between 50 and 99% by weight, preferably between 75 and 99% and even more preferably between 90 and 99%. Polymer should be understood to mean either the compound of formula (I) in the case of the synthesis of block copolymers or the compound of formula (II) in the case of the synthesis of the precursor polymer. This content is maintained, in a known manner, by controlling the temperature, the rate of addition of the reactants and of the polymerization initiator.

The process according to the invention has the advantage of resulting in block polymers of formula (I) having a low polydispersity index.

It also makes it possible to control the molecular mass of the polymers.

The invention therefore also relates to the block polymers which can be obtained by the above process.

In general, these polymers have a polydispersity index of at most 2, preferably of at most 1.5.

The preferred block polymers are those having at least two polymer blocks chosen from the following combinations:

polystyrene/polymethyl acrylate,
polystyrene/polyethyl acrylate,
polystyrene/poly(tert-butyl acrylate),
polyethyl acrylate/polyvinyl acetate,
polybutyl acrylate/polyvinyl acetate,
poly(tert-butyl acrylate)/polyvinyl acetate.

According to one particular method, the invention also relates to the process for preparing block polymers, by radical polymerization, in which, in a first step, the following are brought into contact with one another:

an ethylenically unsaturated monomer of formula: CXX' (=CV—CV')$_b$=CH$_2$ a compound of general formula (IIIA):

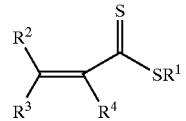

in which at least R$^2$ or R$^3$ represents an SR$^1$ group, these being identical or different, and a radical polymerization initiator, and then the implementation of the first step is repeated at least once, using:

different monomers from the first step and instead of the compound of formula (IIIA), the polymer coming from the previous implementation.

According to this particular method of the invention, the groups R$^2$ and/or R$^3$ represent S-alkyl groups: —SR. When the alkyl radical R of this S-alkyl group is a stabilized radical, satisfying the definition of the group R$^1$ as given above, the precursor compound of formula (IIIA) has the advantage of allowing living radical polymerization on all the ends of the compound (IIIA) carrying groups —SR$^1$. For example, if R$^2$ and R$^3$ represent an —SR$^1$ group, which are identical or different, that is to say if the precursor compound satisfies the following formula (IIIB):

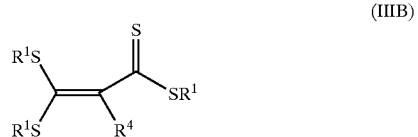

the following polymer may be obtained:

[Structure: central C=C with SP and S= on one carbon, PS and SP on the other]

P representing the polymer chain.

The case may also be envisaged in which only $R^2$ (or $R^3$) is a group of the —$SR^1$ type; in this case, the polymerization may occur at both ends of the precursor compound of formula (III).

According to this particular method of the invention, the compounds of formula (IIIA) may be chosen from the compounds of the following formulae, in which the groups $R^1$, which are identical or different, are defined as previously:

[Structure with $R^1S$, $R^1S$, S=, $SR^1$, $SR^1$]

[Structure with $R^1S$, $R^1S$, two S=, $SR^1$, $SR^1$]

and especially:

[Structure with $(EtCO_2)_2CHS$, $(EtCO_2)_2CHS$, S=, $SCH(CO_2Et)_2$]

indicated previously, these compounds of formula (IIIA) may be such that $R^4$ and $SR^1$ or $R^4$ and $R^3$ form part of the same carbocycle or heterocyclic ring, such as, for example, the following compounds:

[Three ring structures with $SR^1$, Ph groups, S atoms]

and more particularly:

[Ring structure with $(EtCO_2)_2CHS$, Ph, Ph, $SCH(CO_2Et)_2$, S]

The invention also relates to the polymers which can be obtained using this particular method. These polymers generally have a polydispersivity index of at most 2, or even of at most 1.5.

Finally, the process for synthesizing the precursor polymers of general formula (II) also makes it possible to synthesize polymers having a low polydispersity index. In general, these precursor polymers have a polydispersity index of at most 2, preferably of at most 1.5.

Preferably, n is greater than or equal to 6.

The following examples illustrate the invention without, however, limiting the scope thereof.

EXAMPLES

1. Synthesis of the Precursor Compounds of Formula (III)

Example 1.1

Synthesis of Dithioester of Formula (IIIA)

The dithioester of the following formula (IIIA):

[Structure: $CH_3$, $CH_3$, C=C, S=, $SC(CH_3)_2C_6H_5$]

is synthesized.

The process is taken from the reference S. Masson, A. Thuiller, *Tetrahedron Letters,* vol. 23, 4087–4090. Thus, cumyl 3-oxobutanedithioate is treated with 3 equivalents of $CH_3Li$ at –10° C. and then the product obtained is hydrolysed in hydrochloric medium. Next, the reaction product is treated with paratoluenesulphonic acid (0.5 eq) at toluene reflux. The product is purified by chromatography on silica gel (eluent: petroleum ether). The yield is 40%.

Example 1.2

Synthesis of Dithioester of Formula (IIIA)

The dithioester of the following formula (IIIA):

[Structure: $nC_4H_9$, $nC_4H_9$, C=C, S=, $SCH(CO_2Et)_2$]

is synthesized.

The process is taken from the reference H. Vestmijze, H. Kleijn, J. Meijer, P. Vermeer, *Synthesis,* 1979, 432–434. Thus, a suspension of $(n-C_4H_9)_2C$=$CHMgBr$ (1 eq) in THF is prepared in the presence of Cu(I)Br (0.07 eq). One equivalent of $CS_2$ is then added at –50° C. Next, the reaction product is alkylated using 1.3 equivalents of diethyl bromomalonate. The dithioester obtained is isolated by extraction and distillation. The yield is 30%.

Example 1.3

Synthesis of Dithioester of Formula (IIIA)

The dithioester of the following formula (IIIA):

[Structure: $C_6H_5$, $C_6H_5$, $C_6H_5$, C=C, S=, $SCH(CO_2Et)_2$]

is synthesized.

The organomagnesium derivative from triphenylbromoethylene (1 eq) is treated with CS$_2$ (1 eq) at −50° C. in the presence of Cu(I)Br (0.1 eq). The mixture is heated to −20° C. and treated with 0.5 eq of diethyl chloromalonate. After hydrolysis, extraction and washing, the product is isolated on a silica chromatography column (eluent: heptane/ethyl acetate in a ratio of 9/1). The-yield is 12%.

Example 1.4

Synthesis of Dithioester of Formula (IIIA)

The dithioester of the following formula (IIIA):

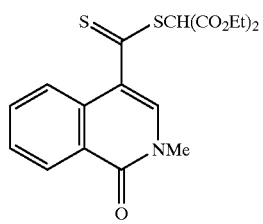

is synthesized.

The process is taken from the reference G. Kobayashi, Y. Matsuda, Y. Tominaga, K. Mizuyama, Chem. Pharm. Bull., vol. 23, 2749–2758 (1975). The process is as follows:

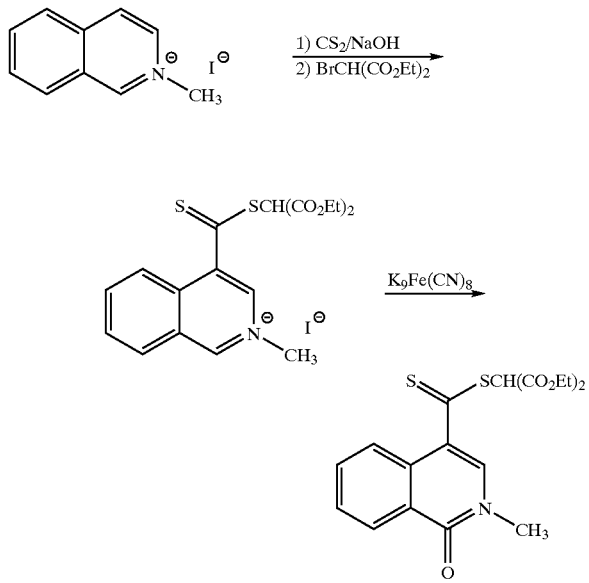

One equivalent of N-methylquinolinium iodide in dimethyl sulphoxide is treated with 2 equivalents of CS$_2$ in the presence of powdered NaOH. The dithiocarboxylate is isolated by filtration and then is treated in a methanol medium in the presence of diethyl bromomalonate. The solid thus obtained is recrystallized in methanol. The dithiocarboxylate is then oxidized in acetone in the presence of K$_3$Fe(CN)$_6$ and NaOH; the reaction product is reprecipitated in water and recrystallized in methanol. The yield is 35%.

Example 1.5

Synthesis of Dithioester of Formula (IIIB)

The dithioester of the following formula (IIIB):

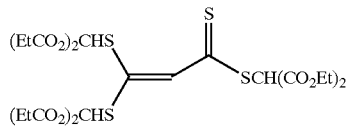

is synthesized.

The process is taken from the reference K. Hartke, N. Rettberg, *Tetrahedron Letters,* 1991, 32, 4679.

One equivalent of dithioacetic acid is treated with 2 equivalents of the lithium salt of hexamethyldisilazane (Li (HMDS)). The temperature is lowered to −78° C. and then CS$_2$ (1 eq) is added; the mixture is brought up to ambient temperature in order to form the C-addition product. Li(HMDS) (1 eq) is added in order to obtain the trianion, which is in turn trialkylated using diethyl bromomalonate.

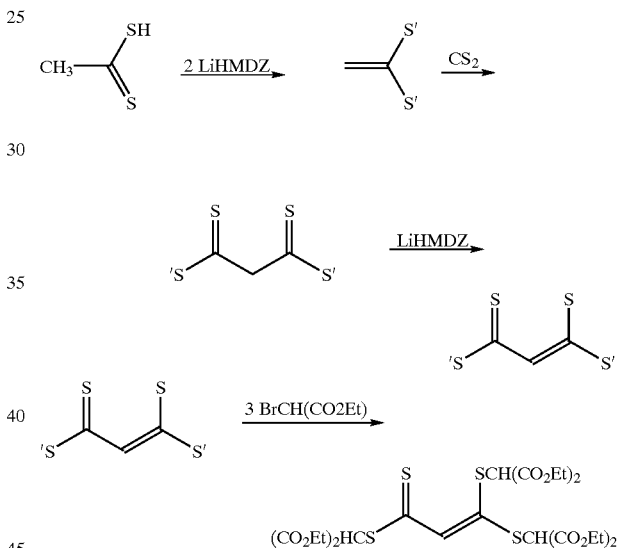

Example 1.6

Synthesis of a Dithioester of Formula (IIIB)

The dithioester of the following formula (IIIB):

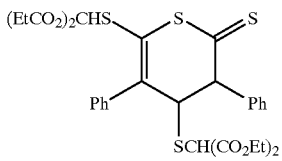

is synthesized.

The compound is prepared by a modification of the procedure described by H. J. Teague and W. P. Tucker, J. Org. Chem. 1967, 32, 3140–3144) by replacing the alkylizing agent with an equivalent quantity of diethyl chloromalonate (overall yield 27%)

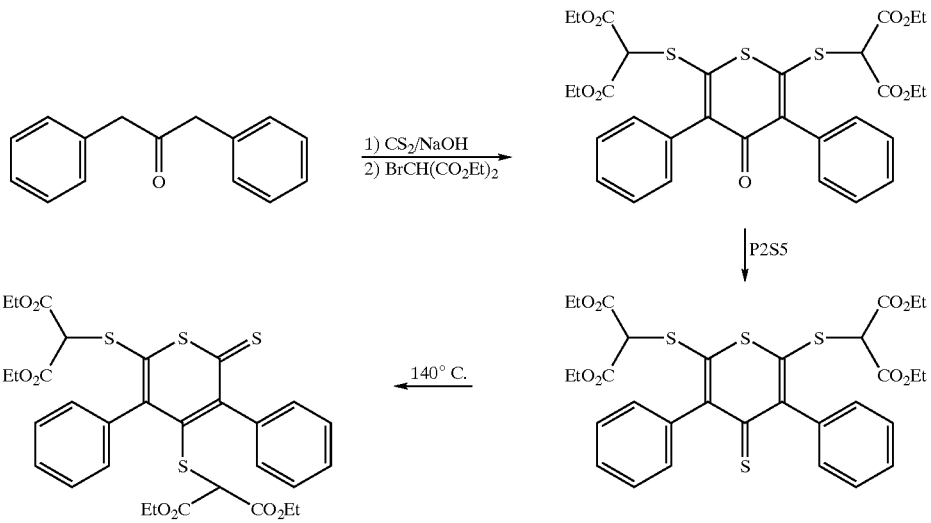

2. Preparation of Homopolymers of Formula (II)

These examples demonstrate that the radical polymerization is controlled by the use of precursors of general formula (III). The control of the reaction appears through the values of the polydispersivity indices $PI=M_w/M_n$, which are less than 1.5, and the values of the number-average molecular mass $M_n$, which are close to the theoretical values and expressed by the following formula:

$$M_n = \frac{M_m}{M_p} \frac{x}{100} M_{mol}$$

where:

$M_m$: mole (s) of monomer $M_p$: mole(s) of precursor of formula (III)

x: conversion of the monomer (%)

$M_{mol}$: molar mass of the monomer (g/mol).

In the examples below, the (co)polymers are analysed by GPC with THF as the elution solvant; the molecular masses are expressed as polysterene equivalents (g/mol).

Example 2.1

Ethyl Acrylate Homopolymer

Introduced into a glass tube are:

0.003 mmol (0.6 mg) of azobis(isobutyronitrile) (AIBN), 10 mmol (1 g) of ethyl acrylate and 0.13 mmol (32.5 mg) of the precursor of Example 1.1.

The tube is connected to a vacuum line, dipped into liquid nitrogen and then three "freezing/vacuum/return-to-ambient" cycles are carried out on the contents of the tube so as to degas it. Next, the tube is vacuum sealed. After returning to ambient, it is immersed in an oil bath preheated to 80° C.

The polymerization lasts 28 hours.

The polymer is recovered by opening the tube and then evaporating the traces of residual monomer, then analysed by GPC. The results are as follows:

degree of conversion: 65% number-average molar mass $M_n$=5500 polydispersivity index PI=1.24.

Example 2.2

Ethyl Acrylate Homopolymer

Introduced into a glass tube are:

0.003 mmol (0.6 mg) of AIBN, 10 mmol (1 g) of ethyl acrylate and 0.13 mmol (48.6 mg) of the precursor of Example 1.2.

After filling the tube, it is degassed and vacuum sealed in a manner similar to Example 2.1.

The polymerization lasts 32 hours at 80° C.

The polymer is recovered by evaporating the traces of residual monomer and analysed by GPC. The results are as follows:

degree of conversion: 72% number-average molar mass $M_n$=5250 polydispersivity index PI=1.28.

Example 2.3

Butyl Acrylate Homopolymer

Introduced into a glass tube are:

0.003 mmol (0.6 mg) of AIBN, 15 mmol (1.92 g) of butyl acrylate and 0.1 mmol (25 mg) of the precursor of Example 1.1.

After the tube has been filled, it is degassed and vacuum sealed in a manner similar to Example 2.1.

The polymerization lasts 35 hours at 80° C.

The polymer is recovered by evaporating the traces of residual monomer and analysed by GPC. The results are as follows:

degree of conversion: 70% number-average molar mass $M_n$=12,500 polydispersivity index PI=1.19.

Example 2.4

Ethyl Acrylate Homopolymer

Introduced into a glass tube are:

0.003 mmol (0.6 mg) of AIBN, 10 mmol (1 g) of ethyl acrylate and 0.13 mmol (62 mg) of the precursor of Example 1.3.

After filling the tube, it is degassed and vacuum sealed in a manner similar to Example 2.1.

The polymerization lasts 48 hours at 80° C.

The polymer is recovered by evaporating the traces of residual monomer and analysed by GPC. The results are as follows:

degree of conversion: 23%
number-average molar mass $M_n$=1500
polydispersivity index PI=1.21.

Example 2.5

Ethyl Acrylate Homopolymer
Introduced into a glass tube are:
0.003 mmol (0.6 mg) of AIBN,
10 mmol (1 g) of ethyl acrylate and
0.13 mmol (45.6 mg) of the precursor of Example 1.4.
After filling the tube, it is degassed and vacuum sealed in a manner similar to Example 2.1.
The polymerization lasts 23 hours at 80° C.
The polymer is recovered by evaporating the traces of residual monomer and analysed by GPC. The results are as follows:
degree of conversion: 55%
number-average molar mass $M_n$=4100
polydispersivity index PI=1.19.

Example 2.6

Styrene Homopolymer
Introduced into a glass tube are:
9.6 mmol (1 g) of styrene and
0.12 mmol (30 mg) of the precursor of Example 1.1.
After the tube has been filled, it is degassed and vacuum sealed in a manner similar to Example 2.25.
The polymerization lasts 72 hours at 110° C.
The polymer is recovered by evaporating the traces of residual monomer and analysed by GPC. The results are as follows:
degree of conversion: 85%
number-average molar mass $M_n$=7500
polydispersivity index PI=1.15.

Example 2.7

Styrene Homopolymer
Introduced into a glass tube are:
9.6 mmol (1 g) of styrene and
0.12 mmol (77 mg) of the precursor of Example 1.5.
After the tube has been filled, it is degassed and vacuum sealed in a manner similar to Example 2.1.
The polymerization lasts 72 hours at 110° C.
The polymer is recovered by evaporating the traces of residual monomer and analysed by GPC. The results are as follows:
degree of conversion: 75%
number-average molar mass $M_n$=4200
polydispersivity index PI=1.28.

Example 2.8

Styrene Homopolymer
Introduced into a glass tube are:
9.6 mmol (1 g) of styrene and
0.12 mmol (63 mg) of the precursor of Example 1.6.
After the tube has been filled, it is degassed and vacuum sealed in a manner similar to Example 2.1. The polymerization lasts 72 hours at 110° C.
The polymer is recovered by evaporating the traces of residual monomer and analysed by GPC. The results are as follows:
degree of conversion: 80%
number-average molar mass $M_n$=4600
polydispersivity index PI=1.35.

3—Synthesis of Block Copolymers of Formula (I)

Example 3.1 p(EtA-b-St) Block Copolymer
A stock solution is prepared from:
4 g of ethyl acrylate,
0.175 g of precursor of Example 1.1 and
8.8 mg of AIBN.
1.06 g of this solution are introduced into a round-bottomed flask. The temperature is raised to 70° C. The polymerization lasts 24 hours after which the races of residual monomer are removed by evaporation.
A small fraction of the polymer obtained is removed and analysed by GPC:
degree of conversion: 76%
number-average molecular mass $M_n$=5300
polydispersivity index PI=1.21.
Introduced into the flask are:
2.08 g of styrene and
4.4 mg of AIBN.
The temperature is raised to 70° C. The polymerization lasts 40 hours.
The traces of residual monomer are removed by evaporation and the copolymer is analysed by GPC:
degree of conversion: 91%
number-average molecular mass $M_n$=19,000
polydispersivity index PI=1.19.

Example 3.1 p(St-b-BuA) Block Copolymer
A stock solution is prepared from:
5.1 g of styrene,
0.175 g of precursor of Example 1.1 and
10 mg of AIBN.
1 g of this solution is introduced into a round-bottomed flask. The temperature is raised to 70° C. The polymerization lasts 24 hours after which the traces of residual monomer are removed by evaporation.
A small fraction of the polymer obtained is removed and analysed by GPC:
degree of conversion: 82%
number-average molecular mass $M_n$=6000
polydispersivity index PI=1.23.
Introduced-into the flask are:
1 g of butyl acrylate and
4.4 mg of AIBN.
The temperature is raised to 70° C. The polymerization lasts 40 hours.
The traces of residual monomer are removed by evaporation and the copolymer is analysed by GPC:
degree of conversion: 95%
number-average molecular mass $M_n$=12,200.
polydispersivity index PI=1.31.

What is claimed is:
1. A process for preparing, by radical polymerization, block polymers of general formula (I):

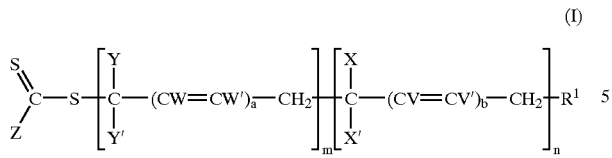

wherein:

Z is an alkene radical, optionally substituted, $R^1$ represents:
- an optionally substituted alkyl, acyl, aryl, alkene or alkyne group (i),
- an optionally substituted or aromatic, saturated or unsaturated, carbocycle (ii), or
- an optionally substituted, saturated or unsaturated, heterocycle (iii), V, V', W and W', which are identical or different, represent H, an alkyl group or a halogen atom, X, X', Y and Y', which are identical or different, represent H, a halogen atom or an R", OR", OCOR", NHCOH, OH, $NH_2$, NHR", $N(R")_2$, $N(R")_2$, $H_2N^+O^-$, $(R")_2N^+O^-$, NHCOR", $CO_2H$, $CO_2R"$, CN, $CONH_2$, CONHR" or $CON(R")_2$ group, wherein R" is alkyl, aryl, aralkyl, alkaryl, alkene or organosilyl groups, optionally perfluorinated and optionally substituted with one or more carboxyl, epoxy, hydroxyl, alkoxy, amino, halogen or sulphonic groups, a and b, which are identical or different, are equal to 0 or 1, m and n, which are identical or different, are greater than or equal to 1 and, when one or other is greater than 1, the individual repeat units are identical or different, said process comprising the step of bringing into contact with each other:

an ethylenically unsaturated monomer of formula:

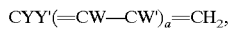

a precursor compound of general formula (II):

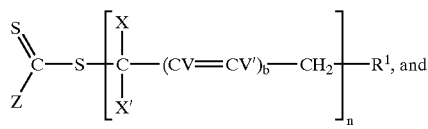

a radical polymerization initiator.

2. A process according to claim 1, wherein the ethylenically unsaturated monomer is styrene, butadiene, chloroprene, (meth)acrylic esters, vinyl esters of carboxylic acid, vinylamine amides, amides of unsaturated carboxylic acids, or vinyl nitriles.

3. A process according to claim 1, wherein $R^1$ represents:
- a group of formula $CR^{12}R^{13}R^{14}$, wherein:
  - $R^{12}, R^{13}$ and $R^{14}$ represent groups (i), (ii) or (iii) as defined above, or
  - $R^{12}=R^{13}=H$ and $R^{14}$ is an aryl, alkene or alkyne group, or
- a —$COR^{15}$ group, wherein $R^{15}$ represents a group (i), (ii) or (iii).

4. A process according to claim 1, wherein $R^1$ is a group of the formula:

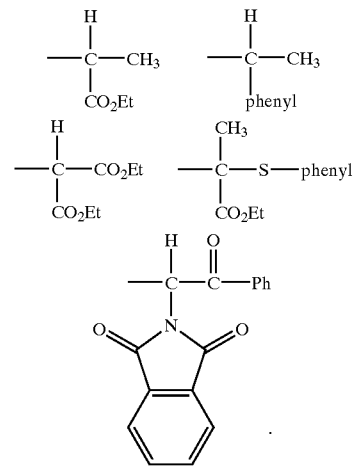

5. A process according to claim 1, wherein the precursor compound of general formula (II) is a polymer and wherein said polymer comes from the radical polymerization of an ethylenically unsaturated monomer of formula: CXX'$(=CV—CV')_b=CH_2$ during which said monomer is brought into contact with a radical polymerization initiator and a compound of general formula (III), (IV) or (V):

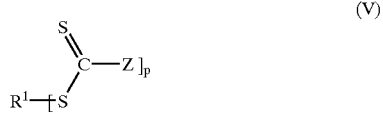

p being between 2 and 10.

6. A process for preparing multiblock polymers, comprising the step of
a) as a first implementation, bringing into contact with each other:

an ethylenically unsaturated monomer of formula CYY'$(=CW—CW')_a=CH_2$, a precursor compound of general formula (II):

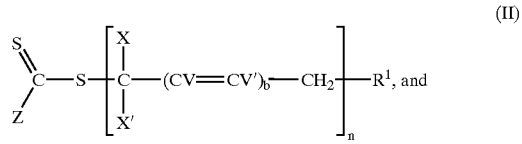

a radical polymerization initiator, wherein n, b, V, V', X, X', Z, $R^1$, Y, Y', a, W, and W' are as defined in claim 1, to obtain a block polymer, b) as a further implementation repeating the implementation of step a), using:

different monomers of formula CYY'$(=CW—CW')_a=CH_2$ from those of the implementation of step a), and instead of the precursor compound of formula (II), the block polymer obtained in step a),
to obtain a multiblock copolymer, c) optionally, as further implementation(s), repeating one or several times the implementation of step b) using:

different monomers of formula $CYY'(=CW—CW')_a=CH_2$ from those of the implementation of the previous implementation, and instead of the block copolymer obtained in step a), the multiblock polymer obtained in the previous implementation.

7. A process according to claim 1, wherein Z is a branched alkene radical, comprising an alkyl, acyl, aryl, alkene or alkyne group as a branch.

8. A process according to claim 1, wherein Z is a branched alkene radical, comprising an aromatic, saturated or unsaturated, carbocycle as a branch.

9. A process according to claim 1, wherein Z is an alkene radical subtituted with alkoxycarbonyl groups, aryloxycarbonyl (—COOR') groups, carboxyl (—COOH) group, acyloxy (—O$_2$CR') groups, carbamoyl (—CONR'$_2$) groups, cyano (—CN) group, alkylcarbonyl groups, alkylarylcarbonyl groups, arylcarbonyl groups, arylalkylcarbonyl groups, phthalimido group, maleimido group, succinimido group, amidino group, guanidimo group, hydroxyl (—OH) group, amino (—NR'$_2$) groups, halogen atoms, allyl group, epoxy group, alkoxy (—OR') groups, S-alkyl groups, S-aryl groups, organosilyl groups, or groups having a hydrophilic or ionic character, being an alkali metal salt of a carboxylic acid, an alkali metal salt of a sulphonic acid, a polyalkylene oxide chain (PEO, PPO), or a cationic quaternary ammonium salt.

10. A process according to claim 1, wherein Z is an alkene radical subtituted with an optionally substituted, saturated or unsaturated, heterocycle.

11. A process according to claim 1, wherein groups and rings (i), (ii) and (iii) are substituted with:

substituted aromatic groups, alkoxycarbonyl groups, aryloxycarbonyl (—COOR') groups, carboxyl (—COOH) group, acyloxy (—O$_2$CR') groups, carbamoyl (—CONR'$_2$) groups, cyano (—CN) group, alkylcarbonyl groups, alkylarylcarbonyl groups, arylcarbonyl groups, arylalkylcarbonyl groups, phthalimido groups, maleimido groups, succinimido groups, amidino groups, guanidimo groups, hydroxyl (—OH) group, amino (—NR'$_2$) groups, halogen atoms, allyl groups, epoxy groups, alkoxy (—OR') groups, S-alkyl groups, S-aryl groups, organosilyl groups, or groups having a hydrophilic or ionic character, being an alkali metal salt of a carboxylic acid, an alkali metal salt of a sulphonic acid, a polyalkylene oxide chain (PEO, PPO), or a cationic quaternary ammonium salt.

12. A process according to claim 6, wherein:

step c) is not implemented and, the multiblock copolymer is a triblock polymer, or step c) is implemented once, and the multiblock copolymer is a quadriblock polymer.

* * * * *